US008886713B2

(12) United States Patent  
Agrawal et al.

(10) Patent No.: US 8,886,713 B2  
(45) Date of Patent: *Nov. 11, 2014

(54) SYSTEM FOR PROVIDING INFORMATION TO A PLURALITY OF USERS

(75) Inventors: Purusharth Agrawal, Austin, TX (US); Todd Young, Austin, TX (US)

(73) Assignee: ProspX, Inc., Austin, TX (US)

( * ) Notice: Subject to any disclaimer, the term of this patent is extended or adjusted under 35 U.S.C. 154(b) by 540 days.

This patent is subject to a terminal disclaimer.

(21) Appl. No.: 13/076,138

(22) Filed: Mar. 30, 2011

(65) Prior Publication Data

US 2011/0246564 A1    Oct. 6, 2011

Related U.S. Application Data

(60) Provisional application No. 61/319,653, filed on Mar. 31, 2010.

(51) Int. Cl.
*G06F 15/16* (2006.01)
*G06Q 30/02* (2012.01)

(52) U.S. Cl.
CPC ............ *G06Q 30/0251* (2013.01); *G06Q 30/02* (2013.01)
USPC ............ 709/203; 709/217; 709/218; 709/219

(58) Field of Classification Search
CPC .................................................... G06Q 30/02
USPC ......................................... 709/203, 217–219
See application file for complete search history.

(56) References Cited

U.S. PATENT DOCUMENTS

| | | | | |
|---|---|---|---|---|
| 5,689,625 | A | * | 11/1997 | Austin et al. ................. 358/1.15 |
| 6,055,570 | A | | 4/2000 | Nielsen |
| 6,067,525 | A | | 5/2000 | Johnson et al. |
| 6,173,295 | B1 | * | 1/2001 | Goertz et al. ................. 715/209 |

(Continued)

FOREIGN PATENT DOCUMENTS

WO    WO 99/62010    12/1999

*Primary Examiner* — Thu Nguyen  
*Assistant Examiner* — Angela Widhalm  
(74) *Attorney, Agent, or Firm* — Haynes and Boone, LLP

(57) ABSTRACT

A method to provide information items to a user includes providing, to a user through a user information handling system (IHS), a first task information update that is associated with the user, wherein the first task information update includes a first information item. The method further includes receiving a second information item through a network from an information provider and storing the second information item in an information database. The method further includes receiving task data and storing the task data in a task database, wherein the task data includes a plurality of tasks, at least one attribute associated with each of the plurality of tasks, and a first task that is one of the plurality of tasks and that is associated with the user. The method further includes retrieving the second information item from the information database. The method further includes retrieving the task data from the task database. The method further includes transforming the first task information update into a second task information update by associating the first information item and the second information item with the first task in response to determining that the first information item and the second information item are related to the at least one attribute associated with the first task, and prioritizing the first information item relative to the second information item. The method further includes providing, to the user through the user IHS, the second task information update that is associated with the user in response to determining that the user is associated with the first task.

17 Claims, 9 Drawing Sheets

(56) References Cited

U.S. PATENT DOCUMENTS

| | | |
|---|---|---|
| 6,466,935 B1 * | 10/2002 | Stuart ................................. 1/1 |
| 6,621,589 B1 * | 9/2003 | Al-Kazily et al. ........... 358/1.15 |
| 6,850,896 B1 | 2/2005 | Kelman et al. |
| 6,938,240 B2 * | 8/2005 | Charisius et al. ............. 717/104 |
| 7,013,290 B2 | 3/2006 | Ananian |
| 7,076,439 B1 | 7/2006 | Jaggi |
| 7,130,879 B1 | 10/2006 | Dayon |
| 7,197,716 B2 | 3/2007 | Newell et al. |
| 7,249,026 B1 | 7/2007 | Bennett et al. |
| 7,409,356 B1 | 8/2008 | Geddes et al. |
| 7,516,088 B2 | 4/2009 | Johnson et al. |
| 7,630,986 B1 * | 12/2009 | Herz et al. ............................. 1/1 |
| 7,747,959 B2 * | 6/2010 | Keller et al. .................. 715/764 |
| 2002/0165898 A1 * | 11/2002 | Duffy et al. .................... 709/102 |
| 2004/0019494 A1 | 1/2004 | Ridgeway et al. |
| 2004/0078268 A1 * | 4/2004 | Sprogis ........................... 705/14 |
| 2005/0192870 A1 | 9/2005 | Geddes |
| 2006/0015904 A1 | 1/2006 | Marcus |
| 2006/0026033 A1 | 2/2006 | Brydon et al. |
| 2007/0244758 A1 * | 10/2007 | Xie ................................... 705/14 |
| 2008/0281610 A1 | 11/2008 | Yoshida et al. |
| 2010/0223557 A1 * | 9/2010 | Kenney et al. ................ 715/736 |

* cited by examiner

SYSTEM FOR PROVIDING INFORMATION TO A PLURALITY OF USERS

CROSS REFERENCE TO RELATED APPLICATIONS

The present application claims priority to U.S. Provisional Application Ser. No. 61/319,653, filed on Mar. 31, 2010, the disclosure of which is incorporated herein by reference in its entirety.

FIELD OF THE DISCLOSURE

Various embodiments of the disclosure pertain to a system and method to provide information to a plurality of users.

BACKGROUND

Conventional systems for providing information to users typically involve storing user identifications in a database, determining from the users the attributes of the types of information they would like to be provided, associating those attributes with the user identification in the database, and then using the attributes to provide the users information that the users would like to be provided. Users may then receive information feeds that include information related to the attributes of their choosing. However, such conventional systems often have attributes associated with the users that are no longer relevant to the users as a result of users neglecting to update the attributes in a timely fashion as their information needs change, and therefore provide the users with either information considered irrelevant or excessive by the users, to the point that the users may become overwhelmed and ignore the information or delete the information without reading it—consequently, important information may become lost in a sea of less important information.

Accordingly, it is desirable to provide an improved system and method to provide information to a plurality of users with an ability to better ensure that information provided to the users is consistently relevant to the users' current needs with minimal effort on the part of the users.

SUMMARY

Various embodiments of the present disclosure are directed to a method to provide information items to a user, the method including providing, to a user through a user information handling system (IHS), a first task information update that is associated with the user, wherein the first task information update includes a first information item, receiving a second information item through a network from an information provider and storing the second information item in an information database, receiving task data and storing the task data in a task database, wherein the task data includes a plurality of tasks, at least one attribute associated with each of the plurality of tasks, and a first task that is one of the plurality of tasks and that is associated with the user, retrieving the second information item from the information database, retrieving the task data from the task database, transforming the first task information update into a second task information update by associating the first information item and the second information item with the first task in response to determining that the first information item and the second information item are related to the at least one attribute associated with the first task, and prioritizing the first information item relative to the second information item, and providing, to the user through the user IHS, the second task information update that is associated with the user in response to determining that the user is associated with the first task.

BRIEF DESCRIPTION OF THE DRAWINGS

FIG. 3b is a schematic view illustrating an embodiment of a user and information management engine used in the user group of FIG. 3a.

DETAILED DESCRIPTION

Figure 1:
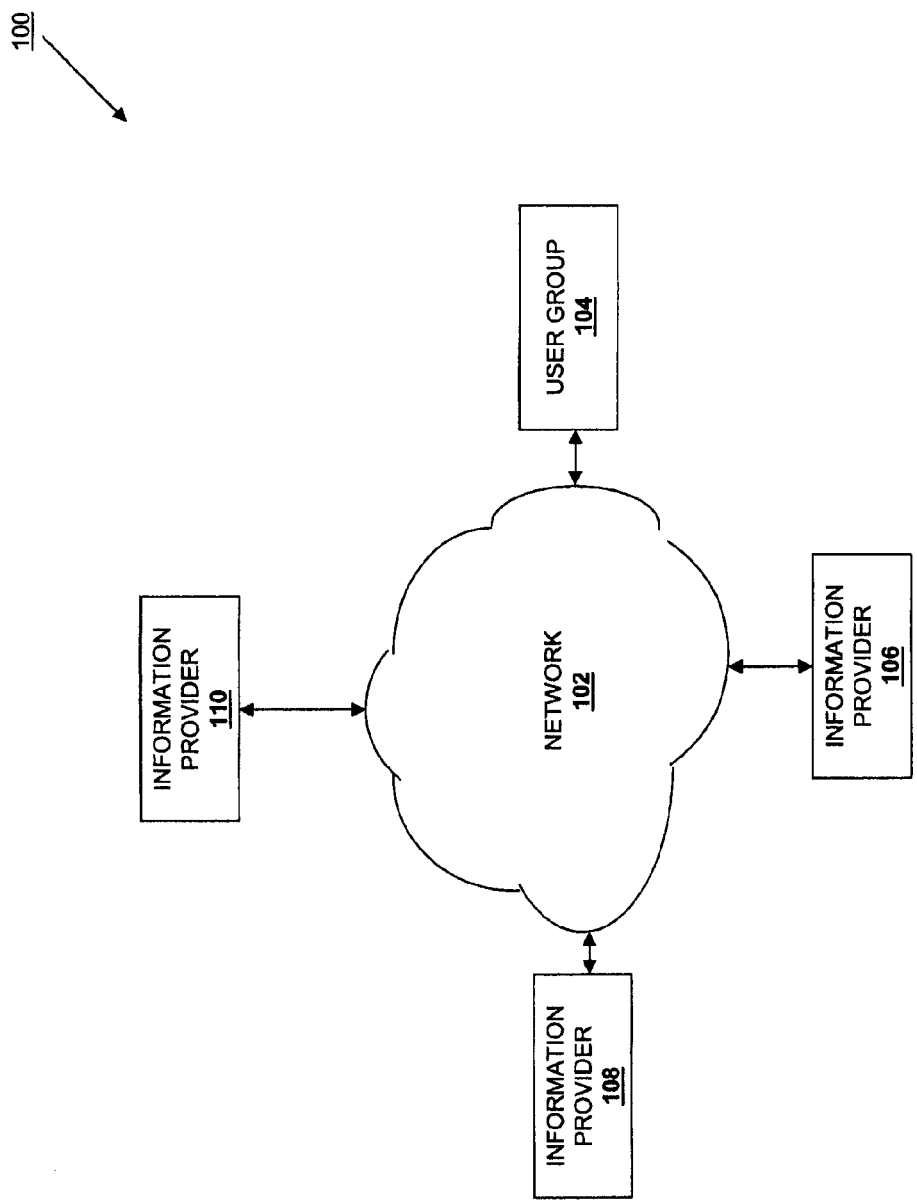
FIG. 1 is a schematic view illustrating an embodiment of a plurality of information providers and a user group coupled together through a network.

Referring now to FIG. 1, in one embodiment, a system 100 for transforming task information and providing the task information to a plurality of users is illustrated. The system 100 includes a network 102 such as, for example, a Transport Control Protocol/Internet Protocol (TCP/IP) network (e.g., the Internet or an intranet). A user group 104 is operably coupled to the network 102. A plurality of information providers 106, 108 and 110 are also operably coupled to the network 102 in order to allow communication between the information providers 106, 108 and 110 and the user group 104. In an embodiment, the user group 104 includes a group of salespersons, a group of lawyers, and/or a variety of other user groups known in the art. In an embodiment, the user group 104 includes a sales organization which includes a plurality of salespersons that sell products and/or services that may be provided or facilitated by the information providers 106, 108 and 110, as is discussed in further detail below. However, the user group 104 may also include a plurality of salespersons across different sales organizations. In an embodiment, the user group 104 includes a law firm which includes a plurality of lawyers that work on legal matters that may be related to information held by the information providers 106, 108 and 110, as is discussed in further detail below. However, the user group 104 may also include a plurality of lawyers across different law firms. In an embodiment, the user group 104 includes any group of users that uses information from the information providers 106, 108, and 110. In an embodiment, the information providers 106, 108 and 110 may be, for example, organizations offering products and/or services such as, for example, insurance products, insurance services, legal information, and/or a variety of other products and/or services known in the art.

Each of the user group 104 and the information providers 106, 108 and 110 includes a respective network interface for communicating with the network 102 (e.g., outputting information to, and receiving information from, the network 102), such as by transferring information (e.g., instructions, data, signals) between such information providers and the network 102. Accordingly, through the network 102, the user group 104 communicates with the information providers 106, 108 and 110, and the information providers 106, 108 and 110 communicate with the user group 104.

For clarity, FIG. 1 depicts only one user group 104. However, the system 100 may include a plurality of user groups. Likewise, for clarity, FIG. 1 depicts only three information providers 106, 108 and 110. However, the system 100 may include any plurality of information providers.

Each of the user group 104 and the information providers 106, 108 and 110 includes a respective IHS, a subsystem, or a part of a subsystem for executing processes and performing operations (e.g., processing or communicating information) in response thereto, as discussed further below. Each such IHS is formed by various electronic circuitry components. Moreover, as illustrated in FIG. 1, all such IHSs are coupled to each other through the network 102. For example, each information provider 106, 108, and/or 110 may include one or more provider IHSs, and each of the users in the user group 104 may include one or more user IHSs. Accordingly, the user group 104 and the information providers 106, 108 and 110 operate within the network 102 through the IHSs.

An IHS is an electronic device capable of processing, executing or otherwise handling information. Examples of an IHS include a server computer, a personal computer (e.g., a desktop computer or a portable computer such as, for example, a laptop computer), or a handheld computer.

Figure 2:
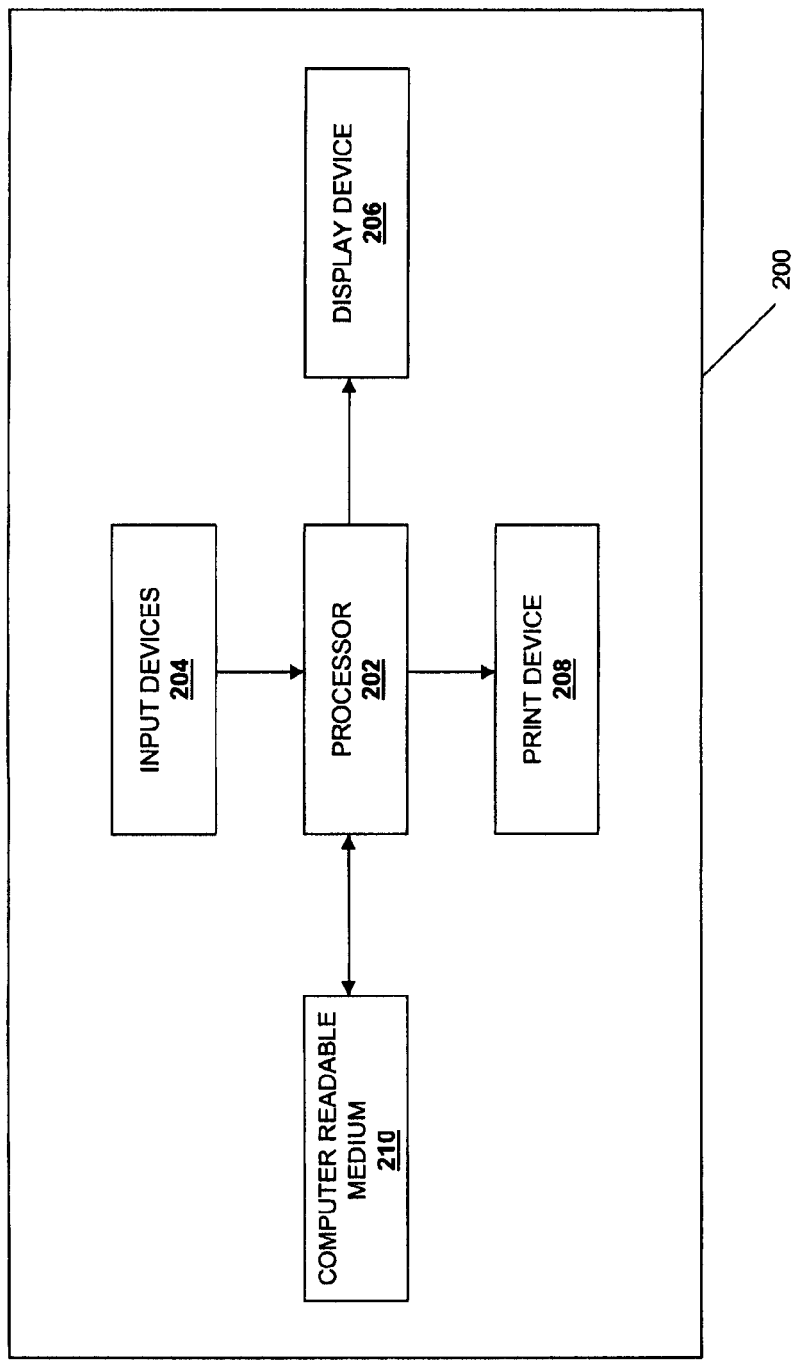
FIG. 2 is a schematic view illustrating an embodiment of an IHS used in the information providers and the user group of FIG. 1.

Referring now to FIG. 2, an IHS 200 which is representative of one of the IHSs described above, is illustrated. The IHS 200 may include any or all of the following: (a) a processor 202 for executing and otherwise processing instructions, (b) a plurality of input devices 204, which are operably coupled to the processor 202, for inputting information, (c) a display device 206 (e.g., a conventional electronic cathode ray tube (CRT) device or a conventional liquid crystal display (LCD)), which is operably coupled to the processor 202, for displaying information, (d) a print device 208 (e.g. a conventional electronic printer or plotter), which is operably coupled to the processor 202, for printing visual images (e.g., textual or graphic information on paper), scanning visual images, and/or faxing visual images, (e) a computer-readable medium 210, which is operably coupled to the processor 202, for storing information, as discussed further below, and (f) various other electronic circuitry for performing other operations of the IHS 200 known in the art.

For example, the IHS 200 may include (a) a network interface (e.g., circuitry) for communicating between the processor 202 and the network 102 and (b) a memory device (e.g., a random access memory (RAM) device or a read-only memory (ROM) device for storing information (e.g., instructions executed by processor 202 and data operated upon by processor 202 in response to such instructions)). Accordingly the processor 202 is operably coupled to the network 102, the input devices 204, the display device 206, the print device 208, and the computer-readable medium 210, as illustrated in FIG. 2.

For example, in response to signals from the processor 202, the display device 206 displays visual images. Information may be input to the processor 202 from the input devices 204, and the processor 202 may receive such information from the input devices 204. Also, in response to signals from the processor 202, the print device 208 may print visual images on paper, scan visual images, and/or fax visual images.

The input devices 204 include a variety of input devices known in the art such as, for example, a conventional electronic keyboard and a pointing device such as, for example, a conventional electronic mouse, trackball, or light pen. The keyboard may be operated to input alphanumeric text information to the processor 202, and the processor 202 may receive such alphanumeric text information from the keyboard. The pointing device may be operated to input cursor-control information to the processor 202, and the processor 202 may receive such cursor-control information from the pointing device.

The computer-readable medium 210 and the processor 202 are structurally and functionally interrelated with one another as described below in further detail. Each IHS of the illustrative embodiment is structurally and functionally interrelated with a respective computer-readable medium, similar to the manner in which the processor 202 is structurally and functionally interrelated with the computer-readable medium 210. In that regard, the computer-readable medium 210 is a representative one of such computer-readable media including, for example, but not limited to, a storage device.

The computer-readable medium 210 stores (e.g., encodes, records, or embodies) functional descriptive material (e.g., including but not limited to software (also referred to as computer programs or applications) or data structures). Such functional descriptive material imparts functionality when encoded on the computer-readable medium 210. Also, such functional descriptive material is structurally and functionally interrelated to the computer-readable medium 210.

With such functional descriptive material, data structures define structural and functional interrelationships between such data structures and the computer-readable medium 210 (and other aspects of the system 200). Such interrelationships permit the data structures' functionality to be realized. Also, within such functional descriptive material, computer programs define structural and functional interrelationships between such computer programs and the computer-readable medium 210 (and other aspects of the system 200). Such interrelationships permit the computer programs' functionality to be realized.

For example, the processor 202 reads (e.g., accesses or copies) such functional descriptive material from the computer-readable medium 210 onto the memory device of the IHS 200, and the IHS 200 (more particularly, the processor 202) performs its operations, as described elsewhere herein, in response to such material which is stored in the memory device of the IHS 200. More particularly, the processor 202 performs the operation of processing a computer application (that is stored, encoded, recorded, or embodied on a computer-readable medium) for causing the processor 202 to perform additional operations, as described elsewhere herein. Accordingly, such functional descriptive material exhibits a functional interrelationship with the way in which processor 202 executes its processes and performs its operations.

Further, the computer-readable medium 210 is an apparatus from which the computer application is accessible by the processor 202 for instructing the processor 202 to perform such additional operations. In addition to reading such functional descriptive material from the computer-readable medium 210, the processor 202 is capable of reading such functional descriptive material from (or through) the network 102. Moreover, the memory device of the IHS 200 is itself a computer-readable medium (or apparatus).

Figure 3A:
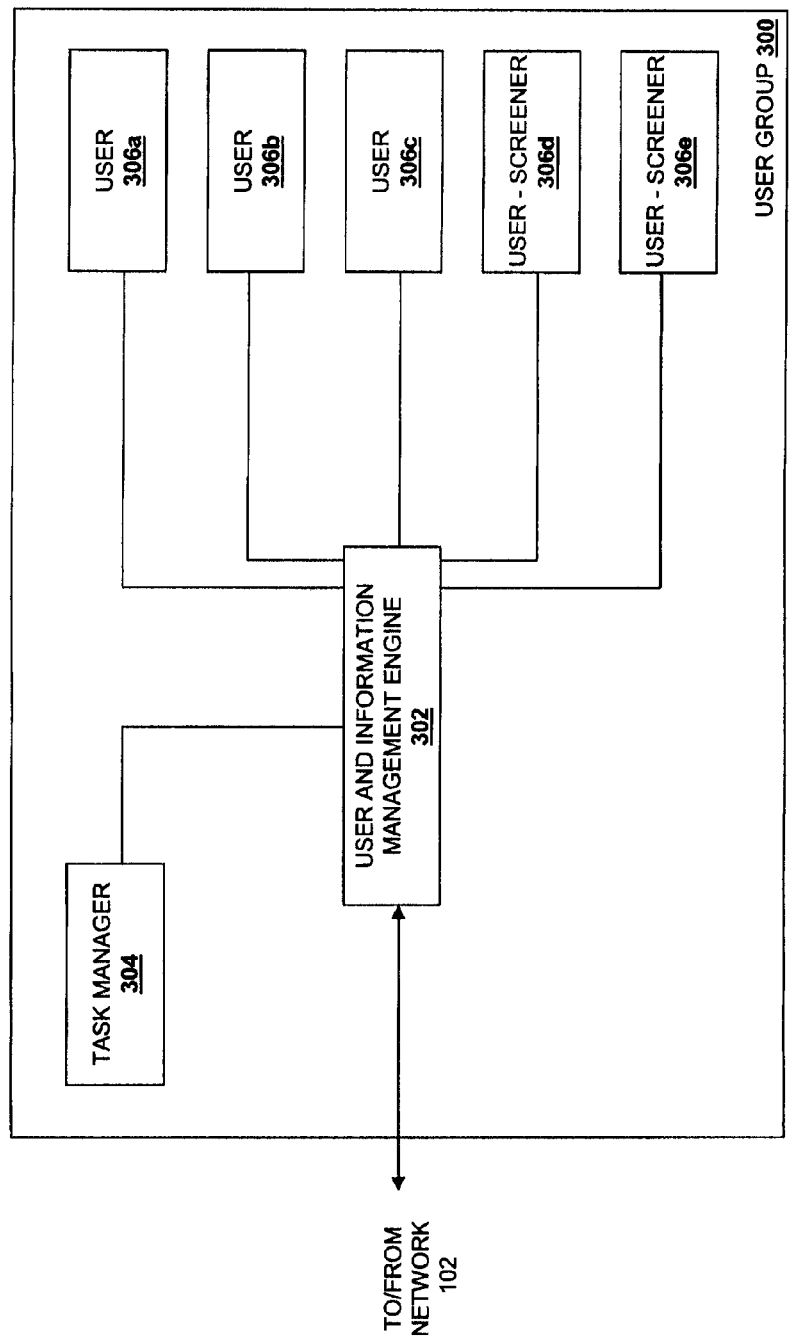
FIG. 3a is a schematic view illustrating an embodiment of the user group of FIG. 1.
Figure 3B:
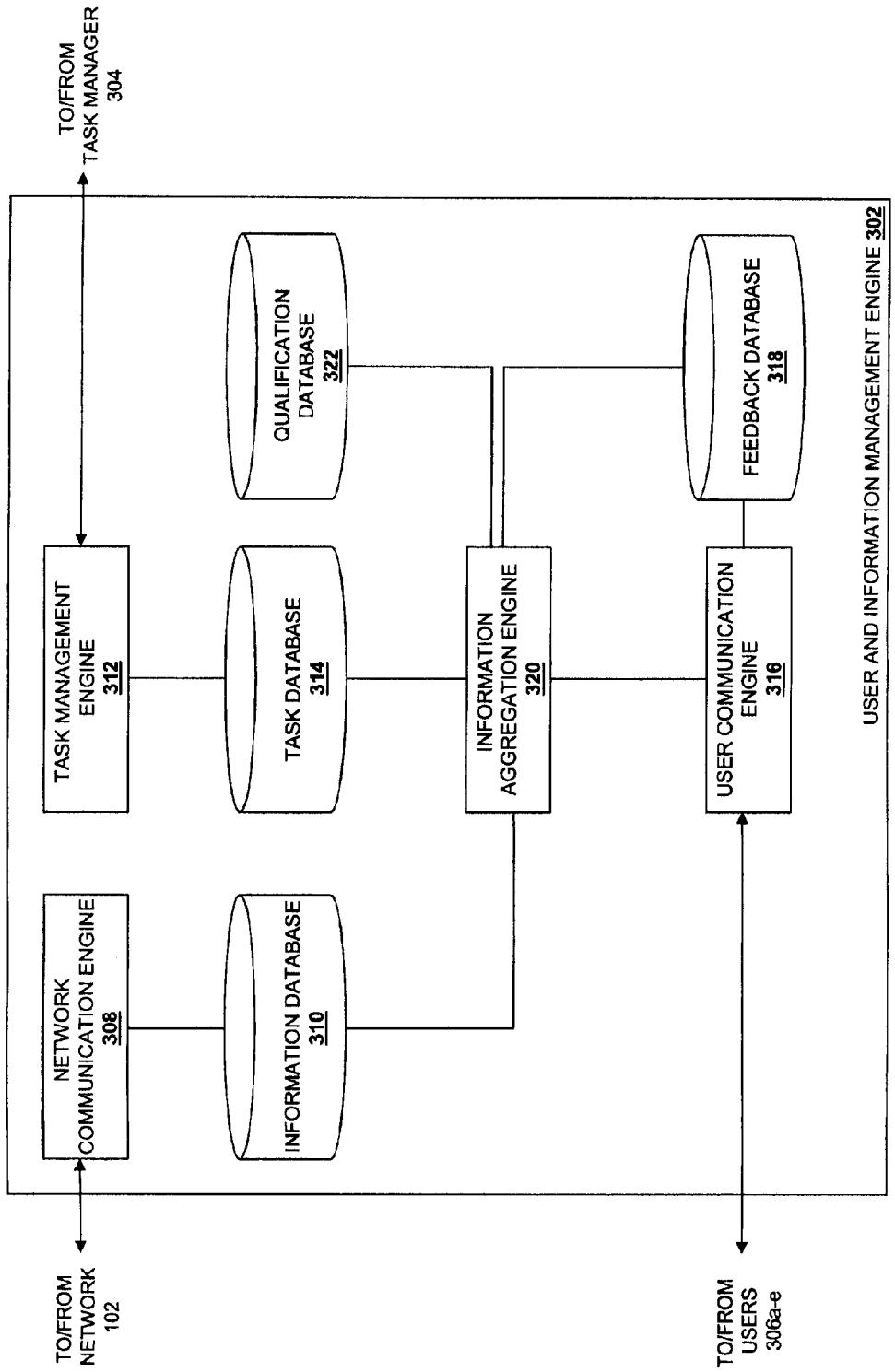
Figure 4:
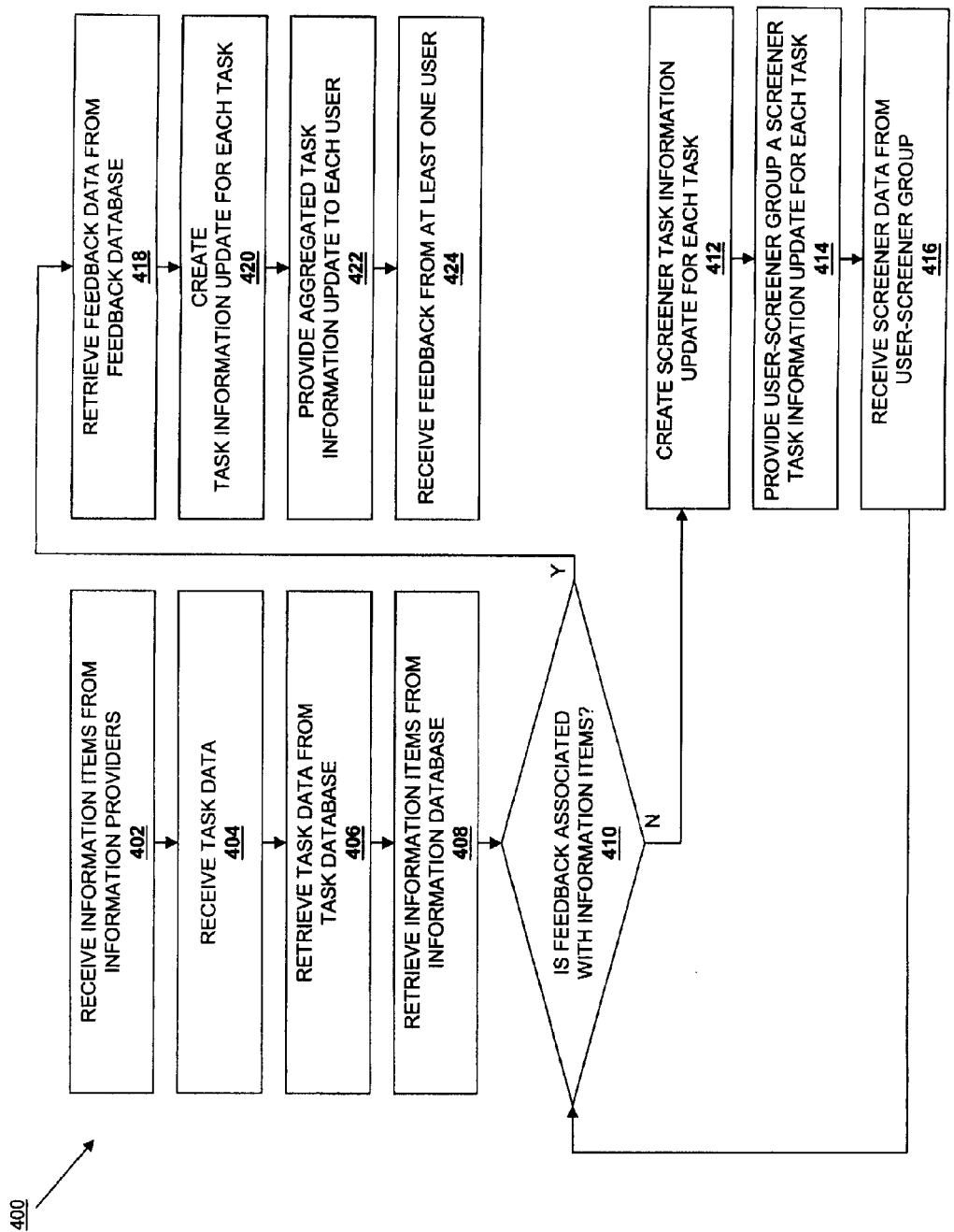
FIG. 4 is a flow chart illustrating an embodiment of a method to provide information to a user.

Referring now to FIGS. 1, 3a, and 3b, a user group 300, which may be the user group 104 described above with reference to FIG. 1, is illustrated in more detail. A user and information management engine 302 which may be, for example, software stored on the computer-readable medium 210 in the IHS 200, is included in the user group 300 and coupled to a network which may be, for example, the network 102. A task manager 304 is operably coupled to the user and information management engine 302. A plurality of users 306a, 306b, 306c, 306d, and 306e are operably coupled to the user and information management engine 302 and, in the illustrated embodiment, include users 306a, 306b, and 306c, and user-screeners 306d and 306e. In an embodiment, the task manager 304 is a manager of the users 306a-e that may determine the tasks assigned to the users 306a-e, as will be discussed in further detail below, and may include a task manager IHS that is operable to send information to the user and information management engine 302. In an embodiment, the users 306a-e may be salespeople, with user-screeners 306d and 306e that are a subset of the users 306a-e and that have been chosen to qualify and/or provide initial feedback for information items when those information items are initially provided to the system, as will be discussed in further detail below.

The user and information management engine 302 includes a network communication engine 308 which may be, for example, software stored on the computer-readable medium 210 in the IHS 200, and which is coupled to a network which may be, for example, the network 102, and to an information database 310. The user and information management engine 302 also includes a task management engine 312 which may be, for example, software stored on the computer-readable medium 210 in the IHS 200, and which is coupled to the task manager 304 and a task database 314. The user and information management engine 302 also includes a user communication engine 316 which may be, for example, software stored on the computer-readable medium 210 in the IHS 200, and which is coupled to the users 306a-e and to a feedback database 318. The user and information management engine 302 also includes an information aggregation engine 320 which may be, for example, software stored on the computer-readable medium 210 in the IHS 200, and which is coupled to the user communication engine 316, the information database 310, the task database 314, the feedback database 318, and a qualification database 322. In an embodiment, the information database 310, the task database 314, the feedback database 318, and the qualification database 322 are conventional databases known in the art. In an embodiment, the information database 310, the task database 314, the feedback database 318, and the qualification database 322 may be located outside the user and information management engine 302 and may still be operably coupled to the user and information management engine 302 and the engines 308, 312, 316, and 320. In an embodiment, the information database 310, the task database 314, the feedback database 318, and the qualification database 322 may all be included in a single database. In an embodiment, the information database 310, the task database 314, the feedback database 318, and the qualification database 322 each include a plurality of databases.

Referring now to FIGS. 1, 2, 3a, 3b, and 4, a method 400 to provide information items to a user is illustrated. The method 400 begins at step 402 where information is received from information providers. In an embodiment, the information providers 106, 108, and/or 110 may use provider IHSs to send information items through the network 102 to the user group 300. The network communication engine 308 in the user and information management engine 302 receives those information items and stores them in the information database 310. In an embodiment, the information items may include news alerts, notifications, product information, services information, company information, and/or a variety of other information that may be relevant to at least some of the users 306a-d in the user group 300. Furthermore, the information providers 106, 108, and/or 110 may provide details about some or all of the information items they send to the user group 300, and those details may be used to categorize the information item according to, for example, the company that the information item is pertinent to, a product the information item is pertinent to, a service the information item is pertinent to, and/or a variety of other information details known in the art. In an embodiment, information items stored in the information database 310 that were received without details may be reviewed by the user group 300 (e.g., the task manager 304, automated processes such as optical character recognition and/or keyword tagging, and/or a variety of other techniques known in the art) in order to create details for those information items such that they may be categorized. In an embodiment, the information aggregation engine 320 may access information items that were received and stored in the information database 310 and use techniques such as keyword searching in order to provide details for information items or supplement the details provided by, for example, connecting with a $3^{rd}$ party data research source or searching the qualification database for details that may be associated with those information items (e.g., contacts known to exist in a company mentioned in the information item).

The method 400 then proceeds to block 404 where task data is received. In an embodiment, the task manager 304 may use a task manager IHS to send task data to the user and information management engine 302. In another embodiment, the users 306a-e may use user IHSs to send the task data to the user and information management engine 302. The task management engine 312 in the user and information management engine 302 receives the task data and stores it in the task database 314. In an embodiment, the task data includes a plurality of tasks, at least one attribute associated with each of the plurality of tasks, and users associated with each of the plurality of tasks. In an embodiment, a task may include a sales opportunity available to users in the user group 300, legal matters worked on by users in the user group 300, and/or a variety of tasks known in the art. In an embodiment, attributes associated with tasks may include the name of a company involved in a sales opportunity, people in the company who may facilitate a sales opportunity, the industry operated in by a company for which a sales opportunity exists, the size of a company for which a sales opportunity exists, a product being sold by a company for which a sales opportunity exists, and/or a variety of other sales opportunity attributes known in the art. In another embodiment, attributes associated with tasks may include an area of law associated with a legal matter, parties associated with a legal matter, and/or a variety of other legal matter attributes known in the art. In an embodiment, the information aggregation engine 320 may access the task data that was received and stored in the task database 314 and use techniques such as keyword searching in order to provide attributes for the tasks or supplement the attributes provided by, for example, connecting with a $3^{rd}$ party data research source or searching the qualification database for attributes that may be associated with those tasks (e.g., known contacts for a sales opportunity, previous court opinions related to a legal matter, and/or a variety of other attributes known in the art).

Figure 5:
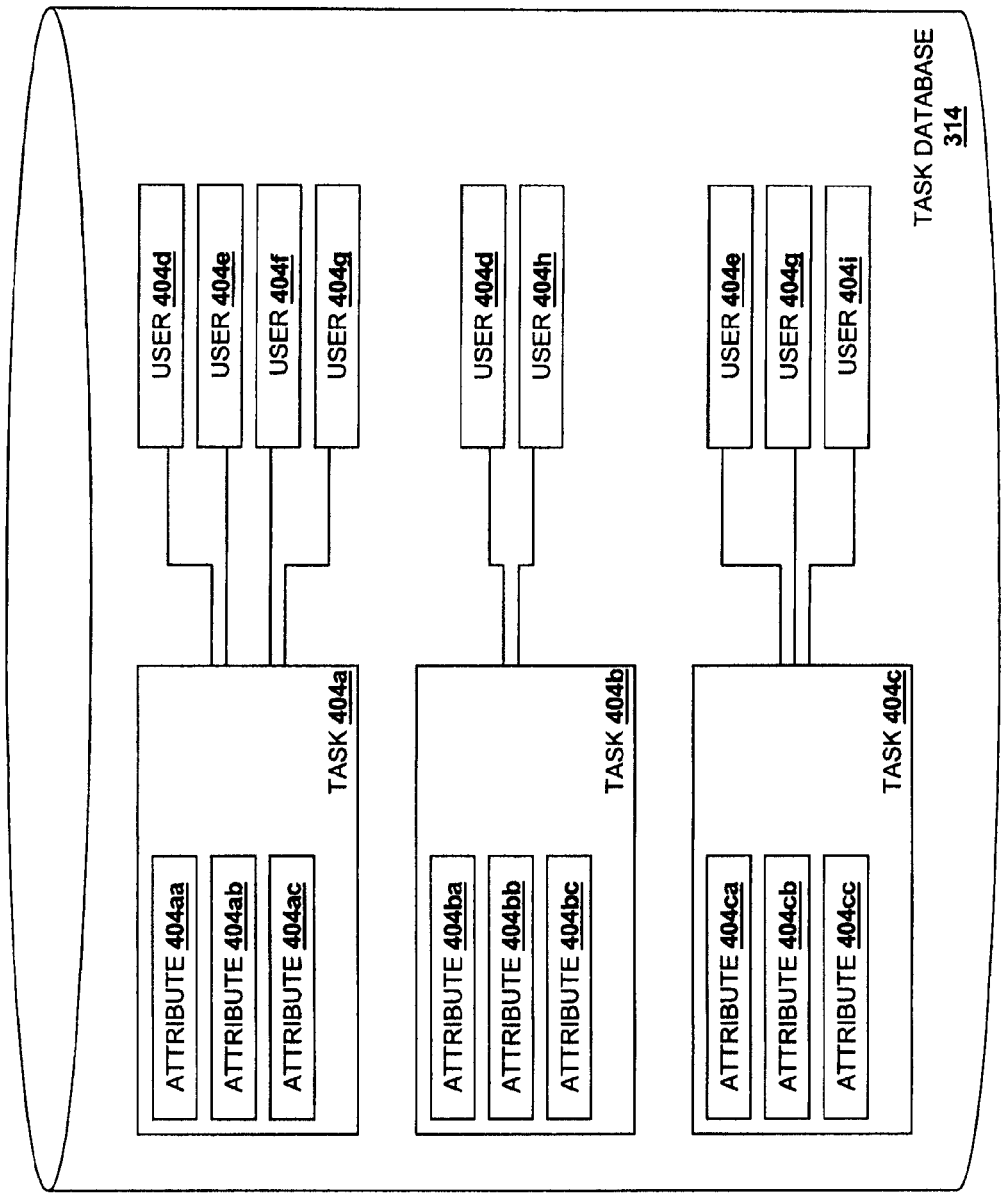
FIG. 5 is a schematic view illustrating an embodiment of a task database used in the user group of FIG. 1.

FIG. 5 is a schematic illustration of an embodiment of task data in the task database 314. The task data received in block 404 of the method 400 may organize a plurality of tasks 404a, 404b, and 404c. As can be seen, task 404a includes attributes 404aa, 404ab, and 404ac, task 404b includes attributes 404ba, 404bb, and 404bc, and task 404c includes attributes 404ca, 404cb, and 404cc. Furthermore, task 404a is associated with users 404d, 404e, 404f, and 404g, task 404b is associated with users 404*d* and 404*h*, and task 404*c* is associated with users 404*e*, 404*g*, and 404*i* (the users 404*d*, 404*e*, 404*f*, 404*g*, 404*h*, and/or 404*i* may be the users 306*a-e*, described above).

Figure 6:
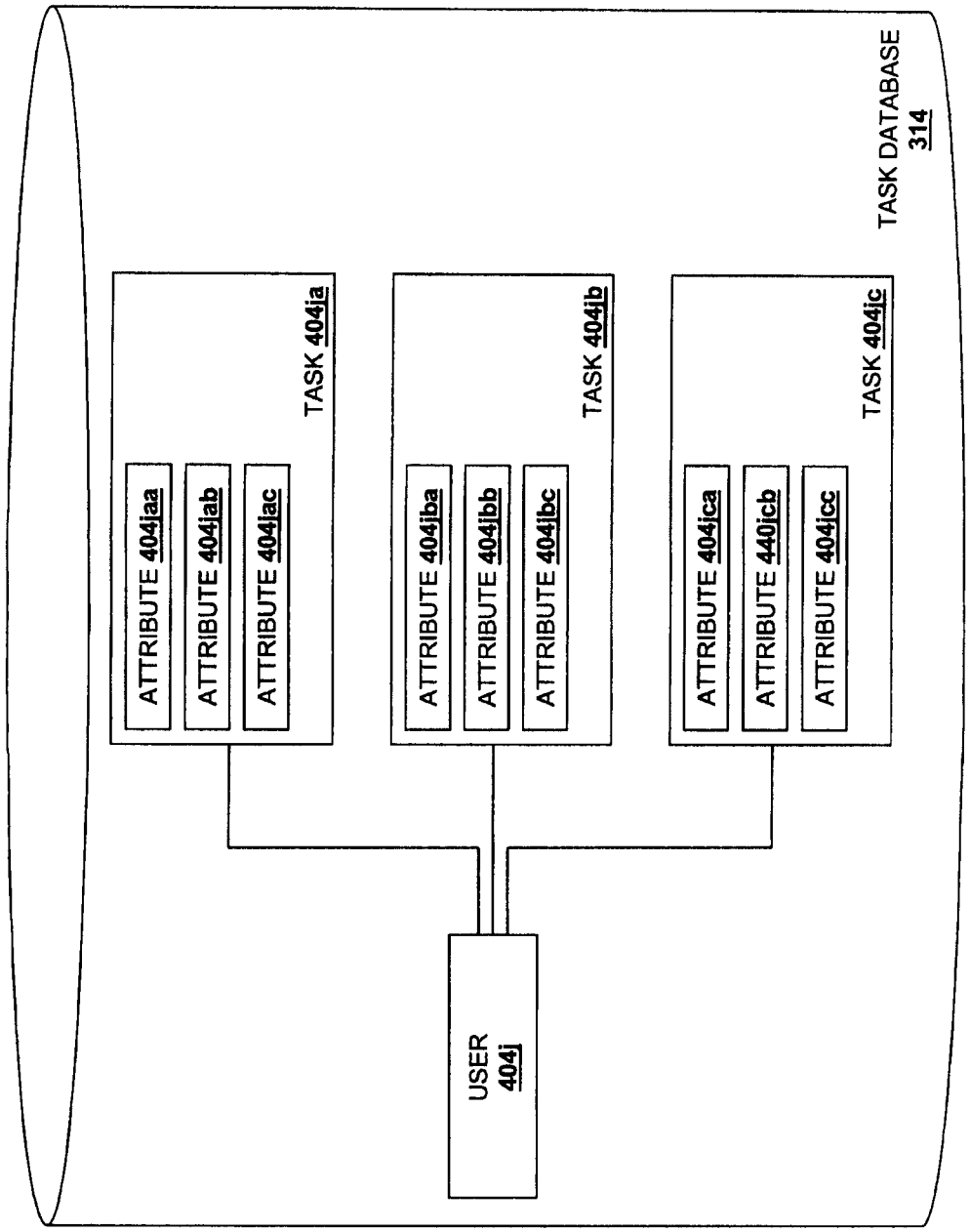
FIG. 6 is a schematic view illustrating an embodiment of a task database used in the user group of FIG. 1.

FIG. 6 is a schematic illustration of another embodiment of task data in the task database 314. The task data received in block 404 of the method 400 may organize a plurality of users such as, for example, user 404*j*, which may be any of the users 306*a-e*, described above. As can be seen, the user 404*j* is associated with a plurality of tasks 404*ja*, 404*jb*, and 404*jc*. Furthermore, task 404*ja* is associated with attributes 404*jaa*, 404*jab*, and 404*jac*, task 404*jb* is associated with attributes 404*jba*, 404*jbb*, and 404*jbc*, and task 404*jc* is associated with attributes 404*jca*, 404*jcb*, and 404*jcc*. While only one user 404*j* has been illustrated, one of skill in the art will recognize that any plurality of users may be associated with a plurality of tasks, with each task associated with attributes, in the same manner as described above with reference to FIG. 6.

Figure 7:
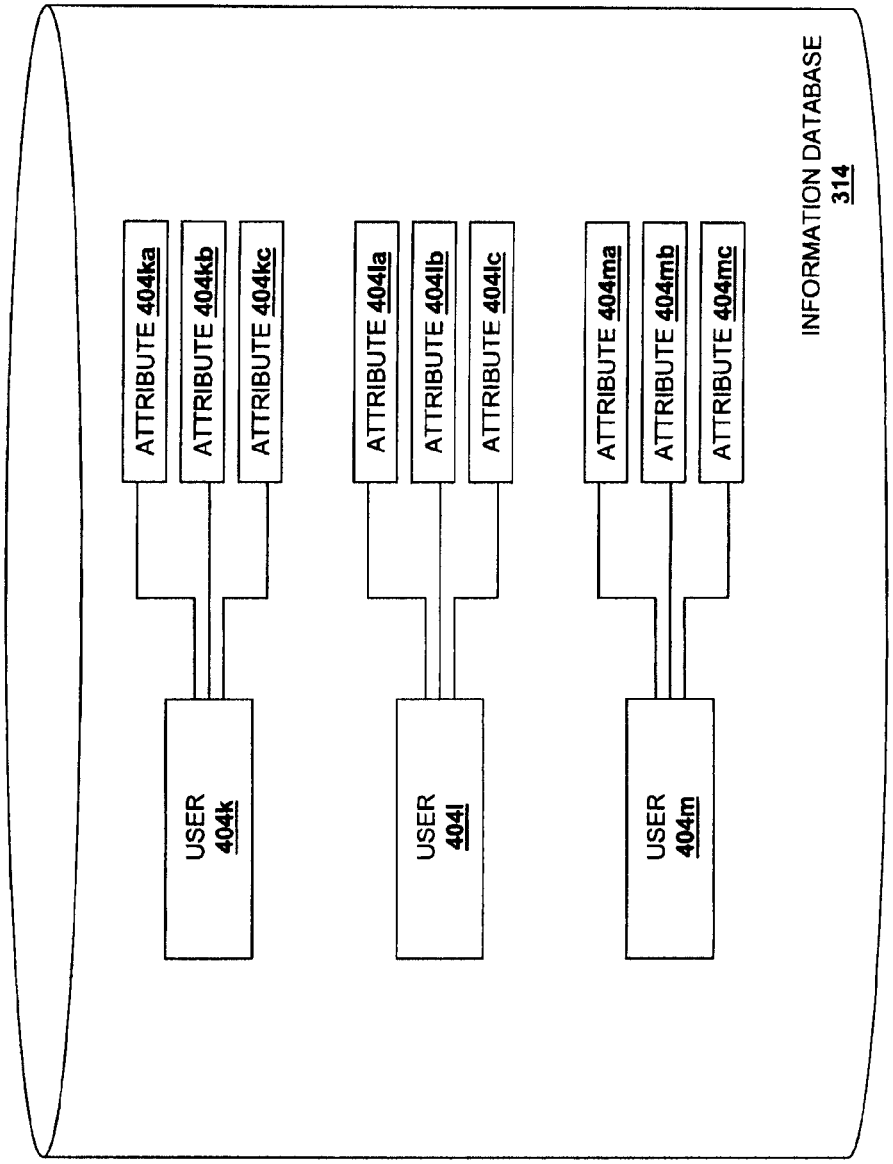
FIG. 7 is a schematic view illustrating an embodiment of a prior art information database.

FIG. 7 is a schematic illustration of an embodiment of a prior art information database that includes a plurality of users 404*k*, 404*l*, and 404*m*. The user 404*k* is associated with attributes 404*ka*, 404*kb*, and 404*kc*. The user 404*l* is associated with attributes 404*la*, 404*lb*, and 404*lc*. The user 404*m* is associated with attributes 404*ma*, 404*mb*, and 404*mc*. Traditionally, information would be provided to the users 404*k*, 404*l*, and 404*m* by matching attributes associated with a particular user with information items that are related to those attributes. In order to modify how information items are distributed in such a system, the attributes of each user must be modified. The task databases illustrated in FIGS. 5 and 6 provide an improvement over these traditional information databases by associating users with tasks that have attributes. While information item relevancy is determined by attribute, the attributes are associated with tasks rather than the users. Thus, in order to modify how information items are distributed in the system of the present disclosure, the task manager 304 (or other user of the method 400) may associate or disassociate users with tasks. For example, a salesperson user may be working on a specific task/sales opportunity and then may be removed from that task/sales opportunity. In order to prevent that salesperson user from receiving information items related to that task/sales opportunity, the salesperson user may be disassociated with the task/sales opportunity. Other salesperson users associated with that task/sales opportunity will continue to receive information items related to that task/sales opportunity. In another example, a task/sales opportunity may conclude. In order to prevent salesperson users from receiving information items related to that task/sales opportunity, the task/sales opportunity may be removed from the task database. In another example, a lawyer user may be working on a specific task/legal matter and then may be removed from that task/legal matter. In order to prevent that lawyer user from receiving information items related to that task/legal matter, the lawyer user may be disassociated with the task/legal matter. Other lawyer users associated with that task/legal matter will continue to receive information items related to that task/legal matter. In another example, a task/legal matter may conclude. In order to prevent lawyer users from receiving information items related to that task/legal matter, the task/legal matter may be removed from the task database. In an embodiment, other actions may be performed on the task data in the task database such as, for example, disassociating attributes and tasks, associating new users with tasks, and/or a variety of other actions known in the art. This and other benefits of the task data and task database 314 will be described in further detail below.

In an embodiment, blocks 402 and 404 of the method 400 result in the building up of information items in the information database 310 and task data in the task database 314 such that each user 306*a-e* is associated with one or more tasks and each of the tasks is associated with one or more attributes. The method 400 may then function to provide the information items to each of the users 306*a-e* as will be described in further detail below. For clarity of discussion, the method 400 will be described with respect to information items provided to particular users and user-screeners. However, one of skill in the art will recognize that the method 400 may operate to provide information items to any of the users 306*a-e*, all of the users 306*a-e*, or any other users in the user group 300 without departing from the scope of the present disclosure.

The method 400 then proceeds to block 406 where task data is retrieved from the task database 314. In an embodiment, the information aggregation engine 320 accesses the task database 314 and retrieves task data that may include a plurality of tasks, at least one attribute associated with each of the plurality of tasks, and at least one user associated with at least one of the plurality of tasks. The method 400 then proceeds to block 408 where information items are retrieved from the information database 310. In an embodiment, the information aggregation engine 320 accesses the information database 310 and retrieves at least one information item. In an embodiment, the information items retrieved at block 408 of the method 400 may include information items received at block 402 of the method 400 and/or information items received in previous uses of the method 400. The method 400 then proceeds to decision block 410 where it is determined whether feedback is associated with the information items retrieved in block 408. The information aggregation engine 320 accesses the feedback database 318 and searches the feedback database 318 for feedback associated with the information items retrieved in block 408. In an embodiment, the feedback associated with the information items retrieved in block 408 may be feedback for information items that were received prior to block 402 of the method 400 and provided to users previously (i.e., during a prior use of the method 400).

If at decision block 410 the method 400 determines that there is no feedback for an information item, the method 400 proceeds to block 412 where a screener task information update is created for each task. The information aggregation engine 320 determines the information items, retrieved in block 408 of the method 400, that should be associated with the tasks retrieved in block 406 of the method 400 by, for example, using the details associated with the information items and the attributes associated with the tasks to determine the information items that are related to the attributes of a particular task and hence provide useful information about that task. In this manner, one or more information items may be associated with each task and a screener task information update may be created for each task that includes that task and information items that are associated with that task. For example, a detail associated with an information item may include a company name and an attribute of a task may include the same company name, and at block 412 that information item may be associated with that task due to the detail of the information item being related to the attribute of the task (i.e., they include the same company name). Each screener task information update may then include a task and all the information items associated with that task, at least one of those information items being an information item that has no feedback associated with it. In an embodiment, some information items may be related to more attributes of a given task than other information items, and those information items may be ranked or prioritized over the information items that are related to less attributes of the task. In an embodiment, a screener task information update for a given task may include information items with feedback (described in further detail below) as well as information items without feedback, and those information items without feedback may be highlighted or otherwise distinguished from the information items with feedback.

The method 400 then proceeds to block 414 where a user-screener group is provided a screener task information update for each task. The information aggregation engine 320 searches through all the user-screeners in the user group 300 and determines a user-screener group that includes a plurality of user-screeners (e.g., user-screeners 306d and 306e) that are associated with the tasks that are associated with the information items for which it was determined there was no feedback in decision block 410. The information aggregation engine 320 then provides the user communication engine 316 the screener task information updates for each user-screener 306d and 306e. The user communication engine 316 then provides, through, for example, a screener IHS that receives the screener task information update(s), each user screener 306d and 306e the screener task information updates that include the tasks that user-screener is associated with. In an embodiment, the screener task information updates may be included with other task information updates (described in further detail below) in an aggregated task information update for a user (described in further detail below). In an embodiment, the user-screeners 306d and 306e may be provided one or more screener task information updates through a single email from the user communication engine 316 that includes an aggregated task information update having a plurality of screener task information updates and/or a plurality of regular task information updates. The single email may be provided on a set schedule (e.g., weekly, bi-weekly, monthly, etc.) chosen by the user, the task manager, or other entity. In an embodiment, the user-screeners 306d and 306e may be provided an aggregated task information update having a plurality of screener task information updates and/or a plurality of regular task information updates on a website that is updated by the user communication engine 316.

The method 400 then proceeds to block 416 where screener data is received from the user-screener group. After receiving the screener task information updates in block 414 of the method 400, the user-screeners 306d and 306e may review each task and the information items associated with those tasks. For each information item, the user-screener 306d and 306e may provide screener data (i.e., feedback from the user-screeners for the information items) through, for example, a screener IHS, to the user communication engine 316, which then stores that screener data in the feedback database 318 as feedback. In an embodiment, the screener data may be positive feedback to indicate, for example, that an information item is good and/or relevant to the task is it associated with. In an embodiment, positive feedback that indicates that an information item is good and/or relevant to the task is it associated with may result in positive feedback for the information provider that provided that information item. In an embodiment, the screener data may be negative feedback to indicate, for example, that an information item is not good and/or relevant to the task is it associated with. In an embodiment, negative feedback that indicates that an information item is not good and/or relevant to the task is it associated with may result in negative feedback for the information provider that provided that information item. In an embodiment, the positive and/or negative feedback may result in prioritization or de-prioritization of an information item relative to another information item or for an information provider relative to another information provider. For example, for multiple information items associated with a given task, information items with more positive feedback will be prioritized over information items with less positive or negative feedback, and information items from information providers that have more positive feedback will be prioritized over information items from information providers that have less positive or negative feedback. In addition, if an information item and/or information provider receives a predetermined amount of negative feedback, that information provider may be restricted from submitting information items to the user group 300. In this manner, information providers may develop 'feedback reputations' that may be used to prioritize and de-prioritize information items associated with a task. Thus, blocks 412, 414, and 416 of the method 400 provide feedback (i.e., screener data) for information items that have yet to receive feedback. In an embodiment, the user-screeners may be selected for the user-screener group in response to determining their accuracy and/or willingness to provide relevant feedback for information items. The method 400 then returns to block 410.

If at decision block 410 the method 400 determines that there is feedback for an information item, the method 400 proceeds to block 418 where feedback data from the feedback database 318 is retrieved. As described above, in an embodiment, the feedback data associated with the information items retrieved in block 408 may be feedback data for information items that were received prior to block 402 of the method 400 and provided to users previously (i.e., during a prior use of the method 400). In an embodiment, the feedback associated with the information items retrieved in block 408 may be screener data for information items that were received in block 402 of the method 400 or previously (i.e., during a prior use of the method 400). The method 400 then proceeds to block 420 where an task information update for each task is created. The information aggregation engine 320 determines which of the information items retrieved in block 408 of the method 400 should be associated with the plurality of tasks retrieved in block 406 of the method 400 by, for example, using the details associated with the information items and the attributes associated with the tasks to determine the information items that are related to the attributes of a particular task and hence provide useful information about that task. In this manner, one or more information items may be associated with each task and a task information update may be created for each task that includes that task and information items that are associated with that task. For example, a detail associated with an information item may include a company name and an attribute of a task may include the same company name, and at block 420 that information item may be associated with that task due to the detail of the information item being related to the attribute of the task (i.e., they include the same company name). Each task information update may then include a task and all the information items associated with that task. The information items for the task in each task information update may then be prioritized. In an embodiment, the feedback data and/or the screener data retrieved from the feedback database 318 may be used to prioritize the information items for the task in each task information update. The feedback data and screener data may include a ranking provided by users and/or user-screeners that may include a 'positive' ranking, a 'neutral' ranking, a 'negative' ranking, a numerical ranking on a predetermined scale, and/or a variety of other rankings known in the art. The information aggregation engine 320 may use an algorithm to weigh the feedback data and the screener data, as well as other data associated with the information items and information providers, in order to prioritize the information items for a task in a task information update relative to each other such that highly regarded and task relevant information items take priority over information items that are lowly regarded and not as task relevant.

The method 400 then proceeds to block 422 where aggregated task information updates are provided to each user. For each user (e.g., the user 306a) in the user group 300, the information aggregation engine 320 may determine which tasks are associated with that user (or, in an alternative embodiment, for each task, the information aggregation engine 320 may determine which users are associated with that task). The information aggregation engine 320 then retrieves each task information update created in block 422 of the method 400 that corresponds to the tasks associated with that user and creates an aggregated task information update that may includes a plurality of task information updates for the tasks that are associated for that user. The information aggregation engine 320 then provides the user communication engine 316 the aggregated task information update created for each user. The user communication engine 316 then provides, through, for example, a user IHS that receives the aggregated task information update(s), each user the aggregated task information update that was created for them and that includes the tasks that user is associated with. In an embodiment, the user may be provided the aggregated task information update through a single email from the user communication engine 316. The single email may be provided on a set schedule (e.g., weekly, bi-weekly, monthly, etc.) chosen by the user, the task manager, or other entity. In an embodiment, the users may be provided the aggregated task information update on a website that is updated by the user communication engine 316.

Figure 8:
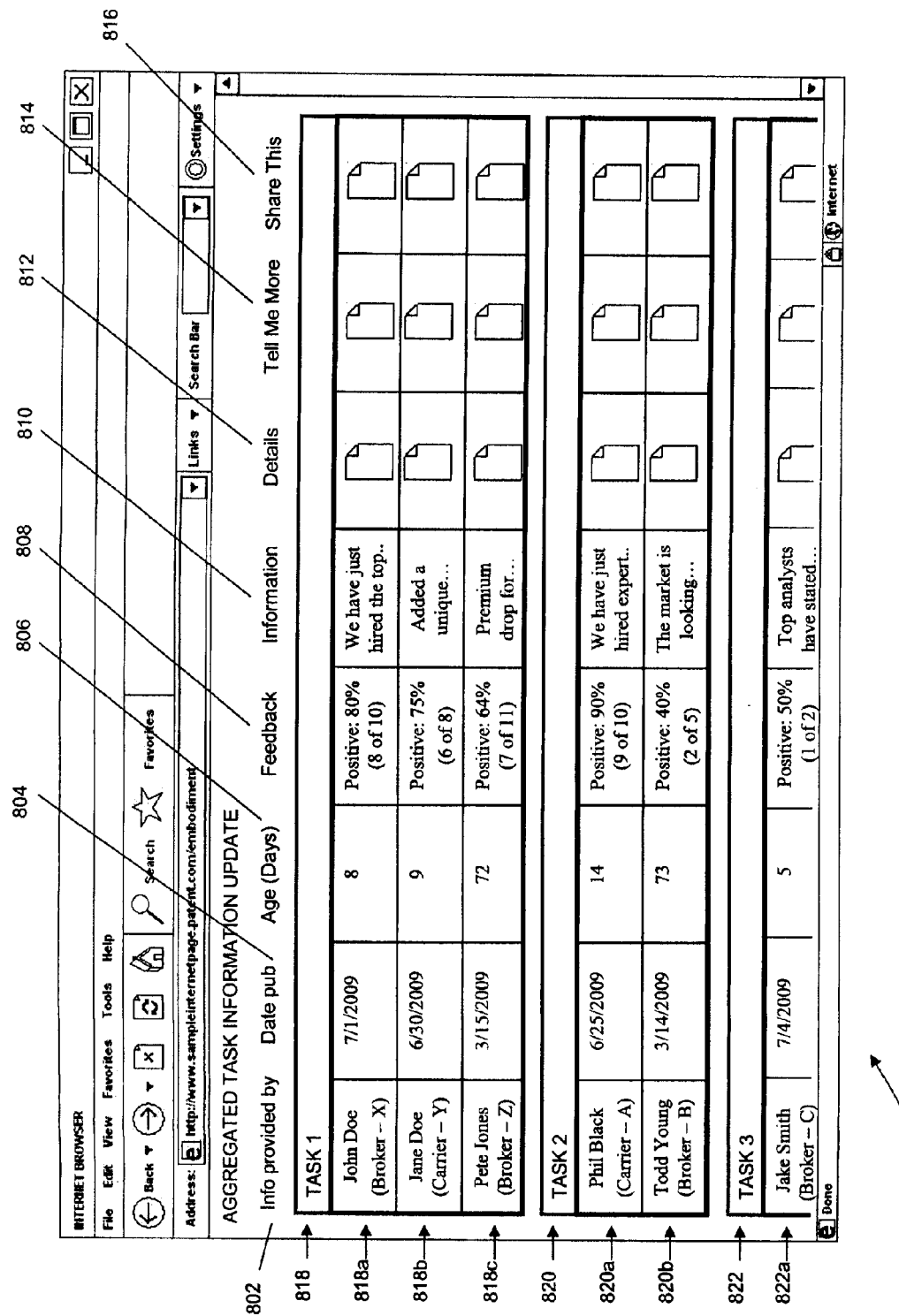
FIG. 8 is a screenshot illustrating an embodiment of an aggregated task information update.

For example, FIG. 8 illustrates an aggregated task information update 800 provided to a user through a website updated by the user communication engine 316. One of skill in the art will recognize that the aggregated task information update 800 may be provided in a single email without departing from the scope of the present disclosure. The aggregated task information update 800 includes a plurality of headings including an 'info provided by' heading 802, a 'date published' heading 804, an 'age' heading 806, an 'information' heading 808, a 'details' heading 812, a 'tell me more' heading 814, and a 'share this' heading 816. The aggregated task information update 800 also includes a plurality of task information updates 818, 820, and 822. The task information update 818 is for a task associated with a plurality of information items 818a, 818b, and 818c, the task information update 820 is for a task associated with a plurality of information items 820a and 820b, and the task information update 822 is for a task associated with an information item 822a. Each of the information items 818a, 818b, 818c, 820a, 820b, and 822a includes an entry that falls under each of the headings 802, 804, 806, 808, 810, 812, and 814. For example, entries in the information items that fall under the 'info provided by' heading 802 may include the provider of the information item and/or the provider affiliation of the provider of the information item, entries in the information items that fall under the 'date published' heading 804 may include the date the information item was received by or first sent out to the user group 300, entries in the information items that fall under the 'age' heading 806 may include the duration of time since the information item was received or first sent out to the user group 300, entries in the information items that fall under the 'information' heading 808 may include information provided with the information item (e.g., the details described above and/or other information related to the information item). Entries in the information items that fall under the 'details' heading 812 may include links to further details on the information items that may include web links, documents internal to the user group, and/or a variety of other detail information known in the art. Entries in the information items that fall under the 'tell me more' heading 814 may include additional information about the information items. Entries in the information items that fall under the 'share this' heading 816 may include links that allow a user to share the information item with other users within or outside of the user group. In an embodiment, the prioritization of the information items 818a, 818b, 818c, 820a, and 820b discussed above may be based on their feedback, outside data, and/or data in the entries in the information items such as, for example, the date published, age, information, and/or a variety of other information known in the art. In an embodiment, in the event the user 306a no longer wants to receive task information updates for a particular task, the task data in the task database 314 may be modified such that the user 306a is disassociated from that task and no longer receives task information updates for that task. In an embodiment, the information aggregation engine 320 may determine, for example, that an information item associated with a particular task has expired (e.g., has reached a predetermined age), and the information aggregation engine 320 may disassociate the information item from that task. As can be seen, information items and the tasks they are associated with are grouped such that a user does not have to determine which informants items are relative to which tasks.

The method 400 then proceeds to block 424 where feedback is received from at least one user. After receiving the aggregated task information updates in block 422 of the method 400, the users may review each task and the information items associated with those tasks. For each information item, the user may provide feedback data (i.e., feedback for the information items from the user) through, for example, a user IHS, to the user communication engine 316, which then stores that feedback data in the feedback database 318 as feedback. In an embodiment, the feedback data may be positive feedback to indicate, for example, that an information item is good and/or relevant to the task is it associated with. In an embodiment, positive feedback that indicates that an information item is good and/or relevant to the task is it associated with may result in positive feedback for the information provider that provided that information item. In an embodiment, the feedback data may be negative feedback to indicate, for example, that an information item is not good and/or relevant to the task is it associated with. In an embodiment, negative feedback that indicates that an information item is not good and/or relevant to the task is it associated with may result in negative feedback for the information provider that provided that information item. In an embodiment, the positive and/or negative feedback may result in prioritization or de-prioritization of an information item relative to another information item or for an information provider relative to another information provider. For example, for multiple information items associated with a given task, information items with more positive feedback will be prioritized over information items with less positive or negative feedback, and information items from information providers that have more positive feedback will be prioritized over information items from information providers that have less positive or negative feedback. In addition, if an information items and/or information provider receives a predetermined amount of negative feedback, that information provider may be restricted from submitting information items to the user group 300. In this manner, information providers may develop 'feedback reputations' that may be used to prioritize and de-prioritize information items associated with a task. The feedback then may be accessed in subsequent uses of the method 400 to prioritize information items that are associated with a given task.

The feedback received at block 424 of the method 400 may also include implicit feedback data. For example, implicit positive feedback data may be generated and associated with a particular information item in response to the user selecting the particular information item to view (e.g., by selecting a link to the information item that includes a title and/or summary of the information item in order to view a full version of the information item) or in response to the user forwarding the particular information item to a customer or prospect. Either explicit and implicit feedback data may be weighted in order to appropriately prioritize the information items relative to each other. While a few examples of implicit feedback have been described, one of skill in the art will recognize that a variety of other implicit feedback will fall within the scope of the present disclosure.

Feedback data may also be compartmentalized based on, for example, attributes of users and/or the tasks those users are associated with. For example, a first user that is associated with a first task and a second user that is associated with a second task may provide feedback for the same information item. The feedback data provided by the first user may be given more weight than the feedback data provided by the second user in the event a third user that is associated with a third task is provided the information item and the third task is either similar to the first task or includes more common attributes with the first task than the second task.

A few examples of the method 400 will now be provided. In one embodiment, the method 400 is used to provide information to the user 306a. In a first use of the method 400, a first task information update is provided to the user 306a similarly as described above such that the user 306a receives a task information update such as, for example, the task information update 818 illustrated in FIG. 8, that is for a task that includes the plurality of information items 818a, 818b, and 818c. A second use of the method 400 results in the receiving of a first information item that is one of a plurality of information items received from the information providers 106, 108, and 110, and storing the first information item in the information database 310. Task data is then retrieved from the task database, and the task data includes a first task that is the task for which the first task information update was provided. The first task information update is then transformed into a second task information update by associating the first information item with the first task in response to determining that the first information item is related to at least one attribute associated with the first task. Thus, the task information update 818 is transformed into a new and different task information update by adding the first information item to the task information update and, in an embodiment, prioritizing the first information item relative to the information items 818a, 818b, and 818c that were previously provided with the task information update 818. The second task information update may then be provided to the user 306a in response to determining that the user 306a is still associated with the task.

In another embodiment, the method 400 is used to provide information to the user 306a. In a first use of the method 400, a first task information update that includes a first information item is provided to the user 306a similarly as described above such that the user 306a receives a task information update such as, for example, the task information update 818 illustrated in FIG. 8, that is for a task that includes the plurality of information items 818a, 818b, and 818c. A second use of the method 400 results in the receiving of a second information item that is one of a plurality of information items received from the information providers 106, 108, and 110, and storing the second information item in the information database 310. Task data is then retrieved from the task database, and the task data includes a first task that is the task for which the first task information update was provided. The first task information update is then transformed into a second task information update by associating the first information item and the second information item with the first task in response to determining that the first information item and the second information item are related to at least one attribute associated with the first task. Thus, the task information update 818 is transformed into a new and different task information update by adding the second information item to the task information update and, in an embodiment, prioritizing the first information item relative to the second information item and/or the previous information items 818a, 818b, and 818c that were previously provided with the task information update 818. The second task information update may then be provided to the user 306a in response to determining that the user 306a is still associated with the task.

In another embodiment, the method 400 is used to provide information to the user 306a. In a first use of the method 400, a first aggregated task information update that includes a plurality of tasks and a first information item associated with each of those tasks is provided to the user 306a similarly as described above such that the user 306a receives an aggregated task information update such as, for example, the aggregated task information update 800 illustrated in FIG. 8, that includes the task information updates 818, 820, and 822 with the plurality of information items 818a, 818b, 818c, 820a, 820b, and 822a. A second use of the method 400 results in the receiving of a second information item that is one of a plurality of information items received from the information providers 106, 108, and 110, and storing the second information item in the information database 310. Task data is then retrieved from the task database, and the task data includes a plurality of tasks that include a first task that the user 306a is associated with such as, for example, the task for which the task information update 818 was provided previously. The first aggregated task information update is then transformed into a second aggregated task information update by associating the first information item and the second information item with the first task in response to determining that the first information item and the second information item are related to at least one attribute associated with the first task. Thus, the aggregated task information update 800 is transformed into a new and different aggregated task information update by adding the second information item to the task information update in the aggregated task information update and, in an embodiment, prioritizing the first information item relative to the second information item and/or the previous information items 818a, 818b, and 818c that were previously provided with that task information update 818. The second aggregated task information update may then be provided to the user 306a in response to determining that the user 306a is still associated with the task.

In another embodiment, the task database that associates attributes with tasks and tasks with users may be used to automatically update user profiles with the tasks they are working on, and then the information items may be provided to the users based on their user profiles that include the up-to-date tasks they are working on.

Thus, a system and method to provide information updates to users has been described that associates information items with tasks and then provides those information items to users in response to determining that the users are associated with tasks. The system and method allow the distribution of information items to be managed in ways that are advantageous to conventional systems and methods, consolidates and prioritizes information items for a given task for each user in order to present the most relevant information items to the user, and provides aggregated task information updates to each user on a periodic basis to ensure that the users are not overwhelmed by a constant stream of information items. In one embodiment, the system and method may be used for salesperson users in a sales user group in order to provide each of the salesperson users consolidated and prioritized information items related to the sales opportunity tasks that the salesperson users are working on. In another embodiment, the system and method may be used for lawyer users in a lawyer user group in order to provide each of the lawyer users consolidated and prioritized information items related to the legal matter tasks that the lawyer users are working on. While examples have been provided, one of skill in the art will recognize many different applications of the system and method 400 that fall into the scope of the present disclosure.

The systems and methods of the present disclosure provide substantial benefits over conventional systems and methods. For example, sales professionals must leverage current and relevant information (from news sources, knowledge bases, etc.) to build an understanding of the needs and challenges faced by their customers and prospects, and the better the sales professional can demonstrate that they are familiar with the business needs and challenges faced by their customers and prospects, and that they are informed about the latest information related to those needs and challenges, the more credibility they earn with the customer or prospect, thereby increasing their chances of keeping the customer's business or earning the prospect's business.

Such sales professionals are often times very good at "relationship building" (for example, they may be great at playing golf with the customer) but may be very poor at consistently and proactively researching and acquiring the information discussed above. While over significant periods of time, often spanning years, a sales professional may gain experience with the information needs of a certain type of customer they deal with on a regular basis (e.g. their "niche") —which may be a focus area by industry, size/class of customer, product type sold to the customer, etc.—sales professionals are often faced with sales opportunities that do not fit their "typical" sales opportunity profile. In such situations, sales professionals may be at a loss for relevant information to most effectively understand, and/or demonstrate that they understand, the needs and challenges faced by the customer or prospect.

Even when sales professionals have developed a strong level of experience around a certain type of customer of prospect ("niche"), market and competitive forces consistently cause changes to the needs of such customers and prospects. This can make it challenging for sales professionals to maintain a current and relevant level of knowledge with respect to such customers and prospects.

Because sales professionals are often poor at actively researching and acquiring information, information is often provided to them by their sales organization in an effort to help them. However, it is difficult for the sales organization to determine the specific information needed by each sales person in the sales organization, particularly when that sales organization is large and includes many different sales professionals that may each be focused on different types of customers and prospects, and to deliver the relevant information to each sales person.

Conventionally, these sales organizations will provide all of the information they acquire to all of the sales persons in the sales organization. This results in "information overload" on the part of the sales person and the sales persons either don't have the time to process all of the information or become overwhelmed and don't process any of the information. Additionally, these sales organizations typically just collect and organize various types of information in a database (e.g. an Intranet site, a document management system, a hard drive, etc.), and struggle because their sales professionals do not take the proactive measures to go to these databases and retrieve the information.

Even when sales organizations are able to get relevant information about the sales opportunities a sales person is working on, the sales person may not recognize the relevance of the information received to the sales opportunities they are working on (e.g. they can't "connect the dots"). This may be because the relevance of the information to the sales opportunity may not be immediately apparent to the sales person (e.g. an insurance sales person may not make the connection between how a nuclear power plant leak in Japan may impact the insurance needs of a local power company in Ohio, or how the same nuclear power leak may impact fuel prices and ultimately the shipping costs of a local trucking company.) Therefore, unless a direct connection can be made between the information provided and the sales opportunities impacted by that information, the information may not be utilized by the sales persons in an optimal fashion.

The Internet has made access to information much easier. Information and news sites abound that aggregate information from various sources on behalf of individuals and deliver the information through newsletters, Web sites, RSS data feeds, etc. However, the information provided through the current technologies is limited in value for several reasons: Information is provided to users based on one or more profiles the users establish or someone establishes on their behalf, information is provided to users based on general demographic information about the user, and or information is provided to the user based on one or more groups or organizations the user belongs to. This current state of the art is limited in several ways. In a sales environment, information based on static profiles, demographic information, and/or group/organization membership can quickly become irrelevant as new sales opportunities are assigned to or selected by an individual and older sales opportunities are either earned or missed and therefore no longer assigned to the individual. Sales persons must constantly find relevant information to support their ability to work on the new sales opportunities. Individuals—especially sales professionals—typically do a very poor job of diligently keeping their profile, demographic and group membership information up to date, thereby limiting the amount of information they are provided that is relevant to the sales opportunities they are working on. Often times, even when the individual does see information that may be pertinent to a sales opportunity they are working on, they may not mentally associate the information with the sales opportunity, and therefore not take advantage of the information to benefit their performance with regards to the sales opportunity.

Furthermore, sales persons are often very protective and confidential/secretive about the sales opportunities they are working on. In many sales organizations, sales persons do not let their peers know about the sales opportunities they are working on for fear of the sales opportunities being poached by their peers. Therefore, it can be very difficult to provide sales professionals with information relevant to the sales opportunities they are working because those the sales persons will typically neglect to disclose most if not all of their sales opportunities.

The systems and methods of the present disclosure provide great advancement of the state of the art and effectiveness of sales persons and sales organizations by automatically matching relevant information with the sales opportunities that a sales person is working on, without the sales person having to manually maintain profiles, demographic information or other group/organization membership information that can quickly become outdated and/or disassociated with the sales opportunities the sales person is currently working on. Furthermore, the disclosed sales opportunities match this information to sales persons without disclosing to others the relevant sales opportunities, and communicate to the sales person which of their sales opportunities the information is relevant to.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system to provide an information item to a user, comprising:
    an information handling system (IHS) coupled to a network;
    an information database and a task database coupled to the IHS; and
    a computer-readable medium located in the IHS, the computer-readable medium comprising computer-readable instructions that, when executed by the IHS, cause the IHS to:
        provide, to a first user through a first user IHS, a first task information update that is associated with the first user;
        provide, to a second user through a second user IHS, a second task information update that is associated with the second user;
        receive an information item through the network from each of a plurality of information providers and store the information items in the information database, wherein the information items include a first information item that is associated with at least one first information item detail;
        receive task data and store the task data in the task database, wherein the task data includes:
            a plurality of tasks that are each associated with a different sales opportunity;
            at least one attribute that is associated with each of the plurality of tasks and that includes at least one of a name of a company involved in the sales opportunity, a person in a company who may facilitate the sales opportunity, an industry operated in by a company for which the sales opportunity exists, a size of a company for which the sales opportunity exists, and a product sold by a company for which the sales opportunity exists;
            a first task that is one of the plurality of tasks and that is associated with the first user; and
            a second task that is one of the plurality of tasks and that is associated with the second user;
        retrieve the first information item from the information database;
        retrieve the task data from the task database;
        transform the first task information update into a third task information update by associating the first information item with the first task in response to determining that the at least one first information item detail associated with the first information item matches the at least one attribute associated with the first task;
        transform the second task information update into a fourth task information update by associating the first information item with the second task in response to determining that the at least one first information item detail associated with the first information item matches the at least one attribute associated with the second task;
        provide, to the first user through the first user IHS, the third task information update that is associated with the first user in response to determining that the first user is associated with the first task; and
        provide, to the second user through the second user IHS, the fourth task information update that is associated with the second user in response to determining that the second user is associated with the second task.

2. The system of claim 1, further comprising:
    a feedback database coupled to the IHS, wherein the computer-readable medium further comprises computer-readable instructions that, when executed by the IHS, cause the IHS to:
    receive feedback data from at least one of the first user IHS and the second user IHS and store the feedback data in a feedback database, wherein the feedback data is related to the first information item.

3. The system of claim 2, wherein the computer-readable medium further comprises computer-readable instructions that, when executed by the IHS, cause the IHS to:
    retrieve the feedback data from the feedback database and use the feedback data to prioritize the first information item relative to a second information item.

4. The system of claim 1, wherein the computer-readable medium further comprises computer-readable instructions that, when executed by the IHS, cause the IHS to:
    provide the first information item to a plurality of screener IHSs; and
    receive screener data from the screener IHSs and store the screener data in the feedback database, wherein the screener data is related to the first information item.

5. The system of claim 4, wherein the computer-readable medium further comprises computer-readable instructions that, when executed by the IHS, cause the IHS to:
    retrieve the screener data from the feedback database and use the screener data to prioritize the first information item relative to a second information item.

6. The system of claim 1, wherein the computer-readable medium further comprises computer-readable instructions that, when executed by the IHS, cause the IHS to:
    modify the task data in the task database by disassociating at least one of the first user with the first task and the second user with the second task.

7. A method to provide information items to a user, comprising:
    providing, to a first user through a first user information handling system (IHS), a first task information update that is associated with the first user, wherein the first task information update includes a first task that is associated with a first information item that is associated with at least one first information item detail;
    providing, to a second user through a second user information handling system (IHS), a second task information update that is associated with the second user, wherein the second task information update includes a second task that is associated with a second information item that is associated with at least one second information item detail;

receiving a third information item through a network from an information provider and storing the third information item in an information database, wherein the third information item is associated with at least one third information item detail;

receiving task data and storing the task data in a task database, wherein the task data includes:
- a plurality of tasks that are each associated with a different sales opportunity;
- at least one attribute that is associated with each of the plurality of tasks and that includes at least one of a name of a company involved in the sales opportunity, a person in a company who may facilitate the sales opportunity, an industry operated in by a company for which the sales opportunity exists, a size of a company for which the sales opportunity exists, and a product sold by a company for which the sales opportunity exists;
- the first task that is one of the plurality of tasks and that is associated with the first; and
- the second task that is one of the plurality of tasks and that is associated with the second user;

retrieving the third information item from the information database;

retrieving the task data from the task database;

transforming the first task information update into a third task information update by associating the first information item and the third information item with the first task in response to determining that the at least one first information item detail associated with the first information item and the at least one third information item detail associated with the third information item match the at least one attribute associated with the first task;

transforming the second task information update into a fourth task information update by associating the second information item and the third information item with the second task in response to determining that the at least one second information item detail associated with the second information item and the at least one third information item detail associated with the third information item match the at least one attribute associated with the second task;

providing, to the first user through the first user IHS, the third task information update that is associated with the first user, wherein the third task information update includes the first task that is associated with a first information item and the third information item; and providing, to the second user through the second user IHS, the fourth task information update that is associated with the second user, where in the fourth task information update includes the second task that is associated with the second information item and the third information item.

8. The method of claim 7, further comprising:
receiving feedback data from at least one of the first user IHS and the second user IHS and storing the feedback data in a feedback database, wherein the feedback data is related to the third information item.

9. The method of claim 8, further comprising:
retrieving the feedback data from the feedback database and using the feedback data to prioritize the third information item relative to at least one of the first information item and the second information item.

10. The method of claim 7, further comprising:
providing the third information item to a plurality of screener IHSs; and
receiving screener data from the screener IHSs and storing the screener data in the feedback database, wherein the screener data is related to the third information item.

11. The method of claim 10, further comprising:
retrieving the screener data from the feedback database and using the screener data to prioritize the third information item relative to at least one of the first information item and the second information item.

12. The method of claim 7, further comprising:
modifying the task data in the task database by disassociating at least one of the first user with the first task and the second user with the second task.

13. A method to provide information items to a user, comprising:
providing, to a first user through a first user IHS, a first aggregated task information update that is associated with the first user, wherein the first aggregated task information update includes a plurality of tasks and at least one information item associated with each of those tasks;

providing, to a second user through a second user IHS, a second aggregated task information update that is associated with the second user, wherein the second aggregated task information update includes a plurality of tasks and at least one information item associated with each of those tasks;

receiving a first information item through a network from an information provider and storing the first information item in an information database, wherein the first information item is associated with at least one first information item detail;

retrieving the first information item from the information database;

retrieving a plurality of task data from a task database, wherein the task data includes:
- the plurality of tasks that are included in the first aggregated task information update and the second aggregated task information update, wherein
- the plurality of task are each associated with a different sales opportunity:
  - at least one attribute that is associated with each of the plurality of tasks and that includes at least one of a name of a company involved in the sales opportunity, a person in a company who may facilitate the sales opportunity, an industry operated in by a company for which the sales opportunity exists, a size of a company for which the sales opportunity exists, and a product sold by a company for which the sales opportunity exist;
  - that the first user is associated with a first task that is one of the plurality of task; and
  - that the second user is associated with a second task that is one of the plurality of tasks;

transforming the first aggregated task information update into a third aggregated task information update by associating the first information item with the first task in response to determining that the at least one first information item detail associated with the first information item matches the at least one attribute associated with the first task, and prioritizing the first information item relative to at least one other information item that is associated with the first task;

transforming the second aggregated task information update into a fourth aggregated task information update by associating the first information item with the second task in response to determining that the at least one first information item detail associated with the first information item matches the at least one attribute associated with the second task, and prioritizing the first information item relative to at least one other information item that is associated with the second task;

providing, to the first user through the first user IHS, the third aggregated task information update that is associated with the first user in response to determining that the first user is associated with the first task; and providing, to the second user through the second user IHS, the fourth aggregated task information update that is associated with the second user in response to determining that the second user is associated with the second task.

14. The method of claim 13, further comprising:

receiving feedback data from at least one of the first user IHS and the second user IHS and storing the feedback data in a feedback database, wherein the feedback data is related to the first information item.

15. The method of claim 14, further comprising:

retrieving the feedback data from the feedback database and using the feedback data to prioritize the first information item relative to the at least one other information item that is associated with at least one of the first task and the second task.

16. The method of claim 13, further comprising:

providing the first information item to a plurality of screener IHSs; and receiving screener data from the screener IHSs and storing the screener data in the feedback database, wherein the screener data is related to the first information item.

17. The method of claim 16, further comprising:

retrieving the screener data from the feedback database and using the screener data to prioritize the first information item relative to the at least one other information item that is associated with at least one of the first task and the second task.

\* \* \* \* \*